Figure 1:
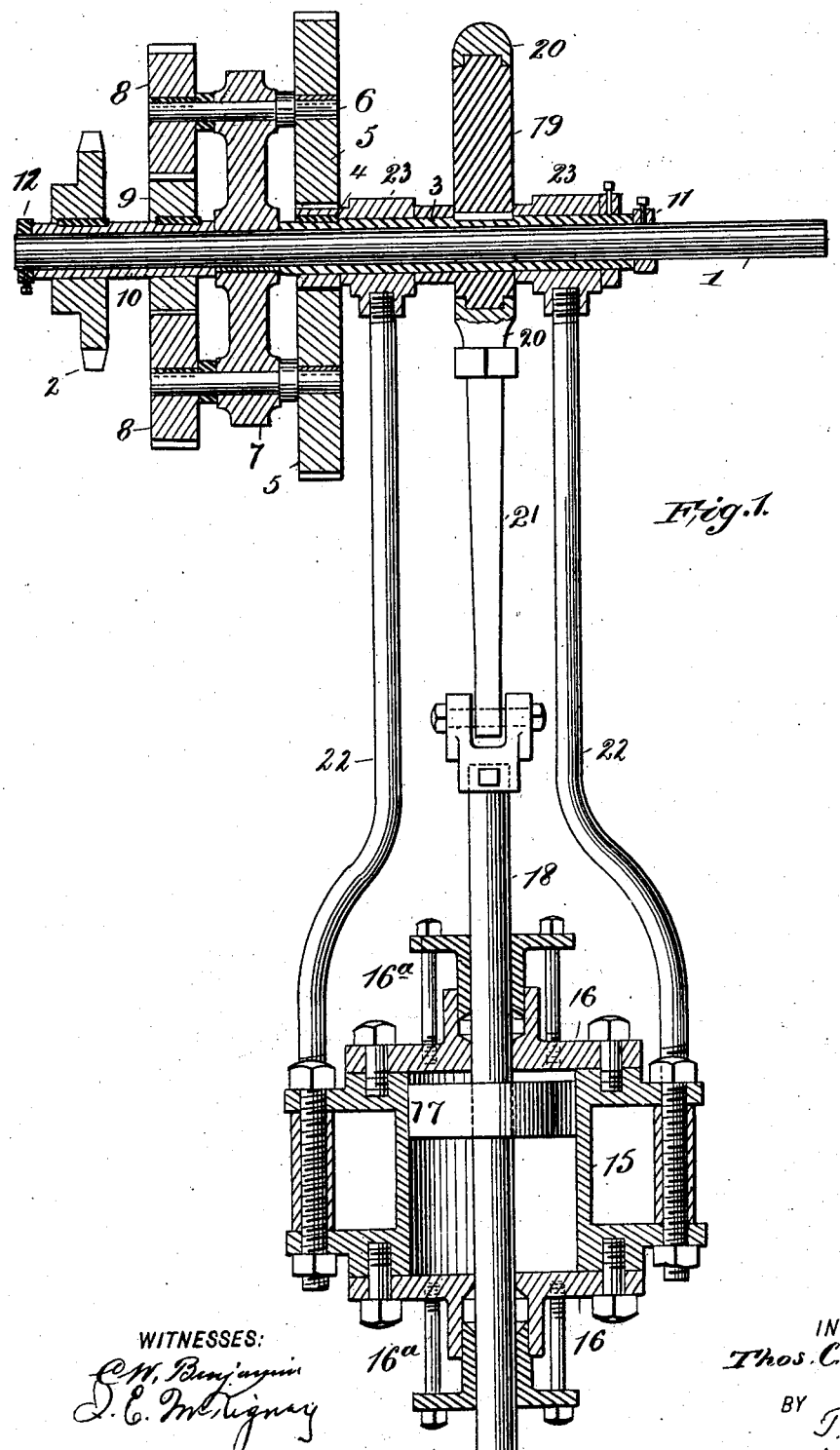

No. 753,856. PATENTED MAR. 8, 1904.
T. C. CHURCHILL.
VARIABLE SPEED TRANSMISSION GEARING.
APPLICATION FILED NOV. 15, 1902.
NO MODEL. 2 SHEETS—SHEET 1.

WITNESSES:

INVENTOR
Thos. C. Churchill.
BY T. F. Bourne
his ATTORNEY

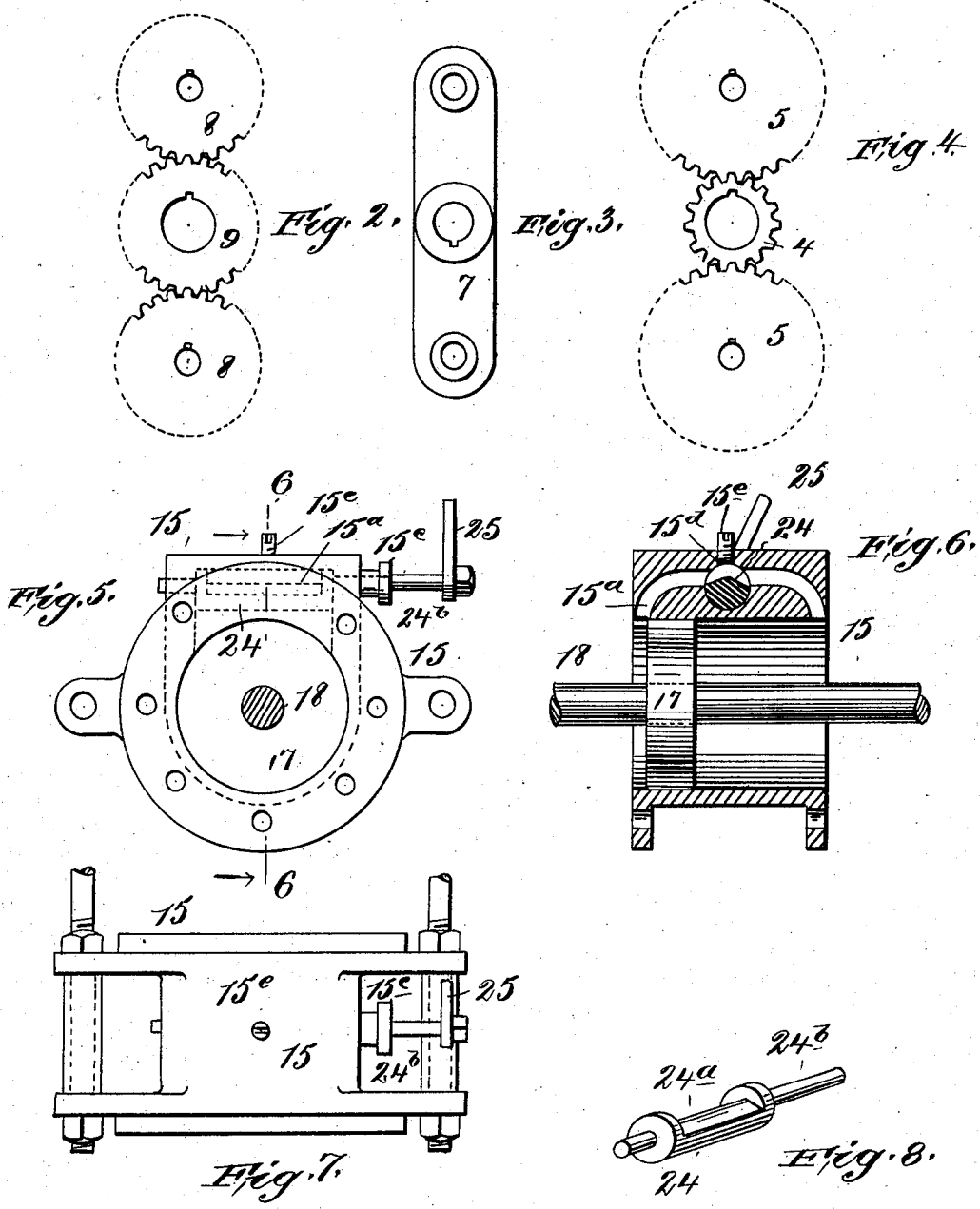

No. 753,856. Patented March 8, 1904.

UNITED STATES PATENT OFFICE.

THOMAS C. CHURCHILL, OF POQUOSON, VIRGINIA.

VARIABLE-SPEED TRANSMISSION-GEARING.

SPECIFICATION forming part of Letters Patent No. 753,856, dated March 8, 1904.

Application filed November 15, 1902. Serial No. 131,480. (No model.)

*To all whom it may concern:*

Be it known that I, THOMAS C. CHURCHILL, a subject of the King of Great Britain, residing in Poquoson district, county of York, State of Virginia, have invented certain new and useful Improvements in Variable-Speed Transmission-Gearing, of which the following is a specification.

In transmitting power from a driving to a driven member it is often desirable to vary the speed of the driven member without altering or changing the speed of the driving member, such as an engine or motor. Such change of speed has been accomplished in various ways—such as by the use of cones, cone-pulleys, and other styles of gearing; but the range of intermediate speeds between the predetermined high and low speeds which may be attained by such devices is comparatively small as known to me.

The object of my invention is to overcome the limitations which have heretofore existed in such respect and to provide mechanism whereby with a driving member having a relatively constant speed the driven member may be rotated at any desired speed from the slowest—say one revolution per minute—to the highest—say equal to the highest speed of the driving member.

In carrying out my invention I provide driving and driven members with gearing between them adapted to operate the latter member by the former and means adapted to coact with said gearing to regulate or control the speed of rotation of the driven member to any desired extent between the lowest and the highest speeds at which said member may be rotated by the driving member and said gearing.

The invention also contemplates the novel details of improvement that will be more fully hereinafter set forth and then pointed out in the claims.

Reference is to be had to the accompanying drawings, forming part hereof, wherein—

Figure 1 is a central section of an apparatus embodying my improvements. Figs. 2, 3, and 4 are detail views of part of the gearing shown in Fig. 1. Fig. 5 is an end view of the speed-controlling cylinder shown in Fig. 1 looking upwardly in said figure, the head of the cylinder being removed. Fig. 6 is a cross-section substantially on the line 6 6 in Fig. 5 looking in the direction of the arrows. Fig. 7 is a plan view of Fig. 5, and Fig. 8 is a detail view of the valve used in connection with the cylinder.

Similar numerals of reference indicate corresponding parts in the several views.

In the drawings the numeral 1 indicates a driving part or member, which may be in the form of a shaft supported in suitable bearings and operated by any well-known means, such as by a motor or engine, (not shown,) and 2 indicates a driven member adapted to be operated by member 1 at varying speeds, which member 2 may be any suitable power-transmitting element, such as a sprocket-wheel, pulley, gear, or the like.

Operatively interposed between the driving member or shaft 1 and the member 2 to be driven is gearing, which I have shown of the epicycloidal type, the arrangement shown being as follows: 3 indicates a sleeve or hollow shaft mounted to rotate concentric with shaft 1 and having a spur gear or pinion 4 secured to it, and pinion 4 meshes with a planet-gear 5, secured to a shaft 6, rotatively carried by a support 7, keyed or otherwise secured to shaft 1, and to the shaft 6 is secured a planet-gear 8, that meshes with a gear or pinion 9, secured to a sleeve or hollow shaft 10, mounted to rotate concentric with shaft 1 and connected with the driven member 2 to rotate the latter, as by being keyed thereto. In the example shown in Fig. 1 the sleeves 3 and 10 are mounted to rotate around shaft 1. While a single pair of gears 5 8 and shaft 6 may be used, it is preferable to use a plurality of such pairs of gears, two pairs being shown, although any suitable number may be used, and gears 5 8 and the shaft 6 could be made in a single piece. Collars 11 and 12, secured upon shaft 1, retain the parts in their proper operative relations. When the driving member or shaft 1 is rotated, it carries the support 7 and the planet-gears 5 and 8 bodily around with it and the parts will operate idly while there is no resistance to the rotation of member 2 or gear 4. If now while shaft 1 rotates, the driven member 2 meets with resistance, the gear will remain stationary, and the gears 5 and 8, traveling bodily around the shaft, will cause the hollow shaft or sleeve 3 through the medium of gear 4 to rotate at a speed proportionate the ratio of the gearing and in the direction reverse to the direction of rotation of shaft 1 in the example of the gearing illustrated. Now if friction or resistance be applied to the hollow shaft or sleeve 3 sufficient to overcome the resistance to the member 2 the hollow shaft or sleeve 10, with its member 2, will begin to revolve through the medium of the gearing and at a speed proportionate to the amount of friction or resistance applied to shaft 3. Thus if the resistance applied to the shaft 3 is sufficient to keep it from rotating the speed of rotation of member 2 will be the highest and proportioned to the speed of member 1 and the ratio of the interposed gearing, and by applying more or less resistance to shaft or sleeve 3 I am enabled to regulate the speed of rotation of member 2 to any extent desired within the limits of the ratio of the gearing and the speed of rotation of member 1. The means I have shown for thus permitting the control of rotation of member 2 are as follows: 15 indicates a cylinder provided with heads 16 and stuffing-boxes $16^a$ and with a piston 17 and piston-rod 18, which may be arranged similarly to the cylinder and piston of a reciprocating engine or in any well-known manner. The piston-rod 18 is connected with shaft 3 to be reciprocated thereby in any suitable form. The arrangement I have shown consists of an eccentric 19, keyed on shaft 3 and connected by a strap 20 and pitman 21 with the piston-rod 18, although a crank could be used instead of the eccentric in well-known manner. The piston-rod 18 is shown extending through both ends of cylinder 15 from piston 17, though they may be separate rods connected with said piston for a purpose to be explained. The cylinder 15 is shown mounted in relation to shaft 1 by means of rods 22, connected with the cylinder and with bearings 23 as a means of retaining the parts in operative connection. The opposite ends of cylinder 15 are in communication, as by means of a port or other duct $15^a$, whereby as piston 17 reciprocates fluid in said cylinder may circulate back and forth from one end of the cylinder to the other on opposite sides of the piston. The speed of travel of such fluid through port $15^a$ may be controlled by means of a valve 24, suitably arranged to control said port. The valve I have shown is journaled in a bore in a housing or the material of the cylinder 15, and the valve is shown in the form of a bar having one side cut away at $24^a$ and provided with a stem $24^b$, extending through a stuffing-box $15^c$ and having a handle or the like 25 to operate the valve; but the valve may be controlled by a governor in well-known manner or by any suitable means. The cylinder and port are to be entirely filled with a fluid—such as glycerin, oil, or other viscid fluid medium or with water—to be retained therein during operation, and the cylinder and port may be filled through an opening $15^d$, maintained closed by a plug or the like $15^e$. (See Fig. 6.) When valve 24 is fully open, as in Fig. 6, the fluid may travel back and forth freely from one end of the cylinder to the other as the piston reciprocates. When the valve is closed, the fluid will prevent the piston from moving, and when the valve is more or less opened the piston 17 may reciprocate with more or less speed, according to the speed with which the fluid can be forced back and forth from end to end of the cylinder. By having the rod 18 extending through the cylinder at both ends the volume of the cylinder is equalized on both sides of the piston in all positions of the latter to provide for corresponding resistance on opposite sides of the piston at all times.

The arrangements described provide a controller for regulating the rotation permitted shaft 3 and gear 4, and the operation of my improvements may be described as follows: Assuming the shaft 1 to be revolving and carrying the support 7 and gears 5 and 8 bodily around with it and the shaft 10, member 2, and gear 9 being held stationary and valve 24 of the cylinder being fully open, it is obvious that the gearing will cause shaft 3 to rotate, and thereby the piston 17 will be reciprocated by means of the eccentric 19, the piston thereby causing the oil or other liquid in the cylinder to pass back and forth from end to end of the cylinder and through the port $15^a$, whereby the parts will be permitted to have free but relatively idle motion. If valve 24 now be gradually closed, resistance to the reciprocations of pistons 17 will arise, and thereby likewise resistance to the rotation of shaft 3 and gear 4 will occur, and as soon as such resistance is greater than the resistance applied to driven member 2 the latter will be caused to rotate through the medium of the gearing and at a speed proportioned to the amount of independent rotation permitted gear 4. The more the valve is closed the slower will be the movement of piston 17 and likewise the slower will be the independent rotation of gear 4, resulting in the proportionate increase in speed of rotation of the driven member 2. When valve 24 is wholly closed, the piston 17 is thereby prevented from moving, the gear 4 will likewise be held from rotation, and thereupon member 2 will be rotated at the highest speed attainable from the rotation of shaft 1 and the interposed gearing.

From the foregoing it will be apparent that by opening and closing valve 24 more or less the speed of rotation of member 2 may be readily controlled, said member being at rest when the valve is fully opened, attaining its highest speed when the valve is fully closed, and rotating at any desired intermediate speed controlled by the reciprocations of piston 17 and the consequent resistance to the rotation of gear 4. The increase of speed of member 2 from nothing up to the high point desired or the decrease of such speed from any high speed to any desired low speed or no speed may be effected very gradually by the mere operation of valve 24, whereby sudden shocks and jars caused by changing speed may be avoided and such as arise by using clutches which are frequently used in transmission-gears. The parts are not liable to undue heating and consequent wear, and therefore are reliable in action.

It will be apparent that the member 2 may be utilized as the driving member and the member or shaft 1 as the driven member, in which case when the rotation of gear or pinion 4 is limited or prevented the rotation of support 7, caused by the gearing, will cause the corresponding rotation of member or shaft 1. It will also be understood that the controller may be connected with pinion or gear 9 and shaft 10 instead of with the pinion or gear 4 and that in such case the member 2 can be connected with pinion or gear 4 and shaft 3 with corresponding variation of speed of the driven member. The ratio of operation of the gearing may be altered as desired to produce different resulting speeds in the driven member, provided, of course, that the gears or pinions 4 and 9 be of different diameters, and, furthermore, that pinions or gears in well-known manner may be interposed between the gears 4 5 and 8 9 to produce different speeds or different directions of rotation of the driven member, as may be desired.

My improvements are applicable for use in many relations and particularly for automobiles, launches, and the like, and I do not limit my invention to the details of construction shown and described, as they may be varied without departing from the spirit thereof.

Having now described my invention, what I claim is—

1. The combination of a driving member, a driven member, and gearing interposed between them, with a cylinder and piston, means to equalize the volume of the cylinder on opposite sides of the piston, means for connecting the piston with an element of said gearing, and means to control the operation of said element by said piston, substantially as described.

2. The combination of a driving member, a driven member, and gearing interposed between them, with a cylinder and piston, means for connecting the piston with an element of said gearing, means to equalize the volume of the cylinder on opposite sides of the piston, means for providing communication between opposite ends of the cylinder, and means for controlling the flow of fluid between opposite ends of the cylinder, substantially as described.

3. The combination of a driving member, a driven member, and gearing interposed between them, with a cylinder and piston, means to equalize the volume of the cylinder on opposite sides of the piston, means for connecting the piston with an element of said gearing, a port providing communication between opposite ends of the cylinder, and a valve to control the passage of fluid through said port, substantially as described.

4. The combination of a driving member, a driven member, and gearing interposed between them, with a cylinder and piston, means for connecting the piston with an element of said gearing, a port providing communication between opposite ends of the cylinder, a valve to control the passage of fluid through said port, and a rod extending from the rear of the piston through the cylinder to equalize the volume of the cylinder on both sides of the piston during the reciprocations of the piston, whereby a controllable resistance is provided to regulate the reciprocations of the piston, substantially as described.

5. The combination of a driving member, a driven member, and two epicycloidal gear-trains connecting said members, with a cylinder and piston, means for connecting said piston with an element of one of said gear-trains, a rod extending from the rear of the piston through the cylinder, and means to control the reciprocations of said piston, substantially as described.

THOMAS C. CHURCHILL.

Witnesses:
I. E. McKIGNEY,
T. F. BOURNE.